July 10, 1928.
L. E. DOUGHERTY
PRESS
Filed April 16, 1925
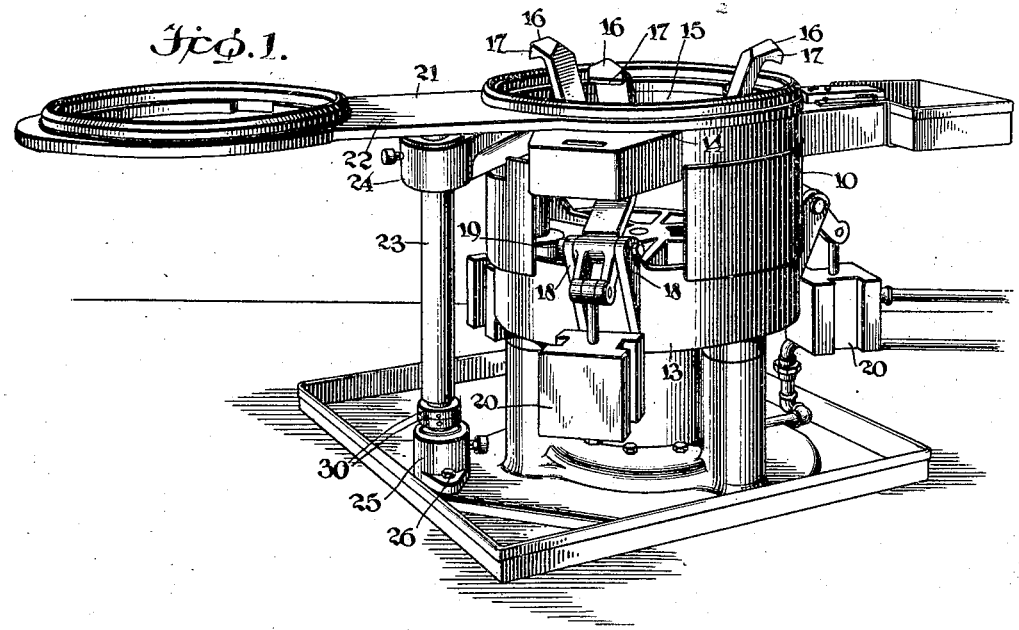
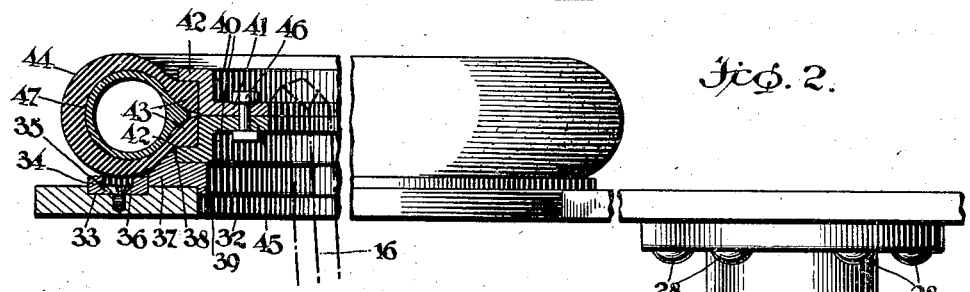
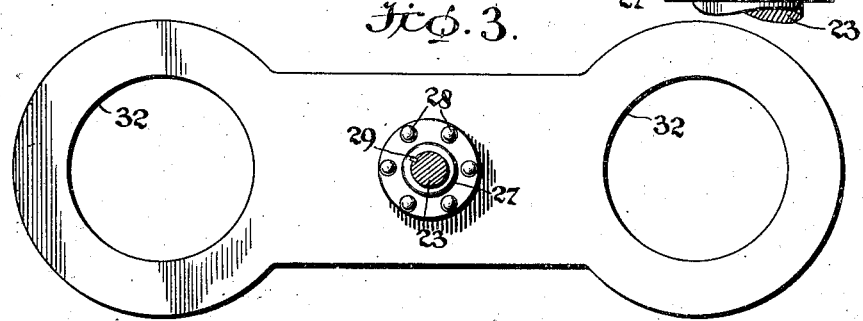
INVENTOR
Leslie E. Daugherty,
BY
ATTORNEY Patented July 10, 1928.

1,676,821

UNITED STATES PATENT OFFICE.

LESLIE E. DOUGHERTY, OF AKRON, OHIO, ASSIGNOR TO THE GOODYEAR TIRE & RUBBER COMPANY, OF AKRON, OHIO, A CORPORATION OF OHIO.

PRESS.

Application filed April 16, 1925. Serial No. 23,721.

My invention relates to a machine for placing rims upon pneumatic tire casings prior to the vulcanization thereof, and it has particular relation to a novel device adapted to be used in connection therewith.

One object of my invention consists in providing a device which will increase the speed of production with reference to presses and reduce the amount of labor incident to the operation thereof.

Another object of my invention is to provide an attachment for a rimming press, adapted to be used for applying rims to pneumatic tire casings, which will permit one tire casing to be supported and prepared for the application of rims while the rimming press is being operated to secure rims on a second tire casing.

In the manufacture of pneumatic tire casings, after the tire has been built and preparatory to vulcanizing it, an air bag, or other core, is placed within the casing. A pair of metallic rims are then placed one on each side of the beads of the tire, the rims are drawn towards each other so as to bring the beads of the casing together, and the rims are clamped in that position by means of bolts. The casing, with its assembled core and rim, is then ready to be placed in a mold for curing.

In order to draw the rims into the desired position, a press, usually known as a rimming press, is employed. As heretofore constructed, the press consisted of a machine having a stationary top, or work supporting table, provided with a large circular opening therein, and a plurality of power actuated arms for drawing the rims together. It was operated by placing a lower rim on the table surrounding the opening, the casing, with its core already inserted, was placed thereon, and a second rim was placed on the upper bead of the casing. The machine was then actuated to cause a plurality of arms to rise through the circular opening, engage the upper rim, and draw it downwardly while the operator placed bolts through suitably provided openings in the rims to hold them in the clamped relationship. The casing, with its attached rim was then lifted from the machine and a lower rim for a second tire casing placed thereon.

On this type of press it was possible to prepare only one casing at a time and the operator was required to wait until the process of applying rims to one casing was completed and the casing removed from the press before additional rims could be applied to a second casing preparatory to clamping them together. With this method of operation, only a single operator could work efficiently and the clamping mechanism was in actual use only a small portion of the time.

My invention obviates the delay heretofore encountered in this manner by providing a device adapted to be attached to the rimming press which is so constructed and mounted that the rims of one casing may be positioned thereon while rims are being applied to another casing by the press. In a machine constructed in accordance with my invention, after the first casing, with its assembled rims, is removed, a second previously positioned casing and rims may be manually swung into position over the press and the rims clamped without removing them from the device.

For a more detailed description of my invention reference may now be had to the accompanying drawings, forming a part of this specification, in which;

Fig. 1 is a perspective view of a rimming press with my novel attachment applied thereto;

Fig. 2 is a fragmentary elevational view of the attachment, portions thereof being shown in cross section for the sake of clearness; and Fig. 3 is a plan view of the attachment illustrated in Fig. 1.

In practising my invention, I have incorporated the novel features thereof in an attachment adapted to be associated with a rimming press 10 mounted upon a suitable foundation and provided, for its operation, with a suitable source of power supply (not shown). The rimming press, in connection with which my invention is illustrated, is of the type disclosed and fully described in a co-pending application of Robert W. Snyder, Serial No. 43,047, filed July 11, 1925.

This press comprises a circular frame member 13, having a horizontal circular top member 14, which is provided with a circular opening 15 therein. A plurality of arms 16 having angular or hooked end portions 17 are normally disposed below the surface of the top member 14. The arms 16 are pivotally mounted on supporting lugs 18 on the member 13 by means of pins 19, and are adapted to be moved upwardly through the opening 15 for the purpose of engaging the metal rims which are applied to the bead portions of tire casings, as shown in dot and dash lines in Fig. 2. A weight member 20 is attached to one end of each of the arms 16 to actuate the hooked ends 17 thereof upwardly to hook over the upper rim member.

An attachment 21, comprising the essentials of my invention is illustrated in the form of an oblong table 22 which is rotatably mounted upon a centrally disposed vertical shaft 23, journalled, at its upper end, in a bearing 24, which is mounted upon the frame 13. The lower end of the shaft 23 is mounted in a bearing 25 secured by means of bolts 26 to the foundation carrying the rimming press.

As best shown in Fig. 2, a flanged collar member 27 is secured to the table 22 at its central point by means of rivets or bolts 28, and is adapted to receive the upper end of the shaft 23. In order to prevent rotation of the shaft 23 with respect to the collar member 27, a key member 29, as best shown in Fig. 3, is inserted within the collar. However, this construction is not absolutely essential to assure efficient operation of the device as the shaft 23 may be formed with a squared end to fit in a squared socket in the table 22, or it may be rigidly supported and its upper end journalled in the collar member 27.

In order to maintain the table 22 at the proper height with respect to the top member 14, and to compensate for wear in the bearings, two collar members 30, in threaded engagement with the shaft 33, and resting on the bearing member 25, are provided. The upper collar member serves as a lock nut for the lower one. If it is desired to readjust the height of the table top, the upper collar is moved away from the lower one so as to release it, the lower one is turned until the desired height is reached, and the upper collar is screwed into engagement therewith. If desired, roller or ball bearings may be employed between the lower collar member 30 and the top of the bearing member 25.

The table 22 is provided, adjacent each end, with a relatively large circular opening 32. Surrounding the opening 32, and concentric therewith in the table 22 is a groove 33 within which a circular ring 34 fits snugly, as best shown in Fig. 2. This ring is secured to the table by means of suitable screws 35. It is evident that the table may be machined or cast with this ring formed integral therewith, if desired. The upper surface of the ring 34 is provided with a groove 36, the bottom of which is in substantially the same horizontal plane as the top surface of the table 22. A removable ring member 37 formed with an annular recess 38 on the upper side and with a circumferential rib 39 on the lower side, is adapted to lie upon the surface of the table 22 in such position that the outer circumferential edge thereof will abut the inner circumferential edge of the ring 34 and the rib 39 will fit snugly into the circular opening 32 of the table 22. Likewise other rings of various sizes may be held in place against the outer side of the ring 34 and in the groove 35 therein to support various sizes of rims utilized in applying rims to casings of different dimensions and types.

The two rim members 40, which are annular in form, are similar and are provided with inwardly extending annular flanges 41, which are adapted to engage each other, and inwardly extending offset flanges 42 which engage beads 43 of a pneumatic tire casing 44. The flanges 41 are each provided with elongated openings 45, adapted to register with each other and to receive T-head bolts 46, which are inserted by hand, when the rim flanges 41 are in engagement with each other, and given a half turn to lock the rims together.

In the operation of my device, a lower rim member 40 is placed so as to surround the opening 32, at one end of the table 22 while the other end thereof is in engagement with the top member 14 of the press. The rim is positioned upon the ring 37 so that the flange 42 fits snugly within the recess 38, as indicated in Fig. 2, and the tire casing 44, with a pneumatic core 47 disposed therein, is then placed over the rim with the beads 43 engaging the flange 42 of the rim. The upper rim member 40 is then placed over the top of the casing and the rims are then ready to be clamped together.

The operator of the machine then manually swings the table about its central pivotal point so as to bring the casing and rims over the top of the rimming press. In their normal position, the arms of the press are disposed below the level of the table 22, thus permitting the table to be swung so that it contacts lightly with the top of the press. The press is then operated in the usual manner by applying suitable power and the arms 16 rise through the open center of the rims and tire casing, the hooked ends 17 thereof engaging the upper rim member 40, and drawing it downwardly against the lower rim as shown in Fig. 2, thereby firmly securing together the beads of the tire casing. In this position of the rims the T-bolts 46 are inserted through the openings 45 to lock the rims and tire beads in close contact. The hooked arms 16 are then released and permitted to fall below the top surface of the press. While the rims are being brought together by the arms 16 and the bolts 46 inserted through the flanges of the rims, another casing may be prepared upon the other end of the table. As soon as the rims are secured together, the table 22 is again rotated so that the new casing and rim may be swung over the press in the same manner as the first, and the assembled casing may be removed preparatory to assembling a third casing.

From this description of my invention, it will be apparent that two operators may work efficiently at a single press without interfering with each other. In the preferred method of operation, while one workman is operating the pressing elements and locking the rims together, the second workman removes from the table the casing just completed and then assembles the two rim members and casing preparatory to moving them within the operating range of the pressing elements 16. Also it will be apparent that a table having more than two casing receiving portions may be utilized if desired.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. In combination, a plurality of movable work supporting devices, sectional clamping members carried by the devices for engaging the work thereon and a press for bringing together the sections of the clamping members as the first mentioned devices are brought successively into registering position with said press.

2. In combination, a plurality of movable work supporting devices, sectional clamping members carried by the devices for engaging the work thereon, a press for bringing together the sections of the clamping members as the devices are brought successively into registering position with the press and means to hold the sections of the clamping members in the fixed relation established by the press.

3. In combination, a plurality of rotatable work supporting devices, sectional clamping members carried by the supporting devices, a press for bringing together the sections of the clamping members as the supporting devices are brought into registering position with the press, and means to hold the sections of the clamping members in the fixed relation established by the press.

4. In combination, a movable table adapted to support a plurality of tire casings, clamping rings for the casings, and a press for clamping the rings upon the casings when the portions of the table supporting the casings register successively therewith.

5. A rimming press attachment comprising a swinging table having oppositely extending portions formed with openings, and a shaft secured to the table centrally thereof for supporting it adjacent the rimming press.

6. A rimming press attachment comprising a centrally mounted swinging table having oppositely extending circular portions formed with openings, and means for positioning an annular member upon the circular portions.

7. A rimming press attachment comprising an oblong pivotally mounted table having oppositely extending circular portions each provided with a grooved rib for maintaining an annular member thereon, a shaft rigidly secured to the table centrally thereof, a bearing member for rotatably supporting the shaft and means for supporting the bearing member.

8. The combination of a rimming press and a member for supporting an annulus adapted to be swung to a position to register with the top of the rimming press.

9. A rimming press attachment comprising an oblong swinging table having oppositely extending circular portions, each circular portion being provided with means for maintaining thereon various sizes of annular members.

10. The combination with a rimming press comprising a stationary platform having an opening therein, a plurality of members supported immediately below the platform, and means for moving the members through the openings into engagement with the rims to clamp them together during downward movement of the support, of means for carrying the tire and rims into position immediately over the platform.

11. The combination with a rimming press comprising a stationary platform having an opening therein, a plurality of members supported immediately below the platform, and means for moving the members through the openings into engagement with the rims to clamp them during downward movement of the support, of an elongate member mounted adjacent the press for carrying the tire and rims immediately over the platform.

12. The combination with a rimming press comprising a stationary platform having an opening therein, a plurality of members supported immediately below the platform, means for moving the members through the opening into engagement with the rims to clamp them together during downward movement of the support, of an elongate member having oppositely extending supporting surfaces for carrying tires and rims immediately over the platform and a shaft having bearings on the press for rotatably supporting the elongate member adjacent the press.

In witness whereof, I have hereunto signed my name.

LESLIE E. DOUGHERTY.